J. ARRENBRECHT.
NUT LOCK.
APPLICATION FILED JULY 26, 1910.
972,796.
Patented Oct. 18, 1910.
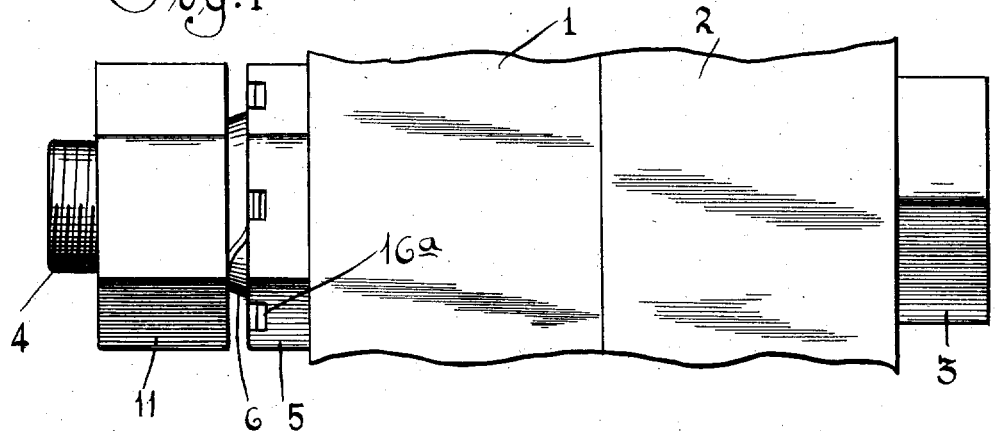
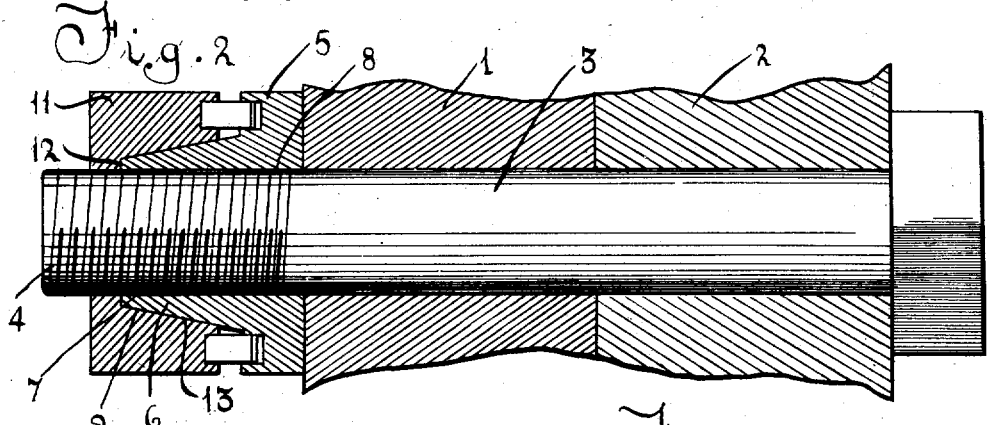
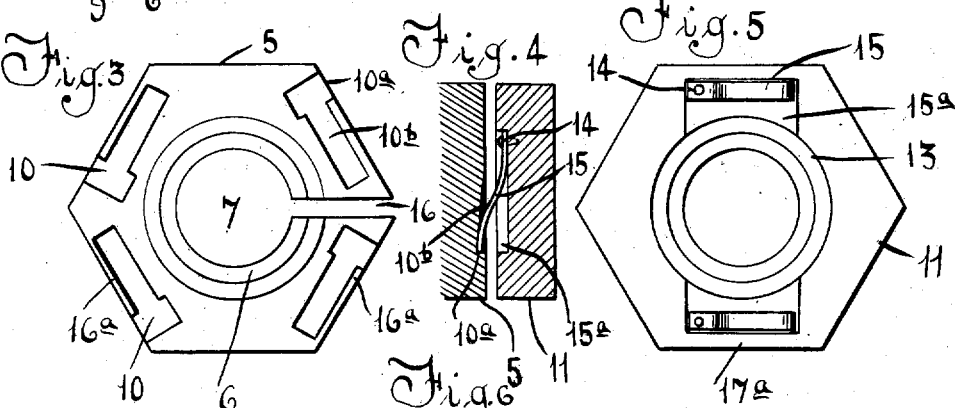
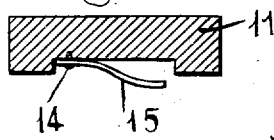
WITNESSES
Edwin Frey
R. H. Butler
INVENTOR
J. Arrenbrecht
By ___ Attorneys

UNITED STATES PATENT OFFICE.

JOHN ARRENBRECHT, OF SALEM, OHIO.

NUT-LOCK.

972,796.  Specification of Letters Patent. Patented Oct. 18, 1910.

Application filed July 26, 1910. Serial No. 573,897.

*To all whom it may concern:*

Be it known that I, JOHN ARRENBRECHT, a citizen of the United States of America, residing at Salem, in the county of Columbiana and State of Ohio, have invented certain new and useful Improvements in Nut-Locks, of which the following is a specification, reference being had therein to the accompanying drawing.

This invention relates to nut locks, and the objects of my invention are to provide positive and reliable means for locking a nut upon a bolt whereby it cannot become accidentally displaced, and to provide a nut lock that can be advantageously used in connection with rail joints, bridges, rolling stock and structure subjected to vibrations which have a tendency to loosen nuts upon bolts.

Further objects of my invention are to provide a simple, durable and inexpensive nut lock that can be used in connection with the ordinary type of bolt, and further, to provide a nut lock that can be easily and quickly installed and removed without injuring the nut or bolt.

These and such other objects as may hereinafter appear are attained by the mechanical construction to be hereinafter specifically described and then claimed.

Reference will now be had to the drawing, wherein:—

Figure 1 is a side elevation of the nut lock, Fig. 2 is a longitudinal sectional view of the same, Fig. 3 is an end view of a split nut forming part of the device, Fig. 4 is a horizontal sectional view of a portion of the nut lock, Fig. 5 is an end view of the locking nut, and Fig. 6 is a horizontal sectional view of a portion of the same.

In the accompanying drawing, the reference numerals 1 and 2 denote, by the way of an example, two pieces of material adapted to be connected by a bolt 3 having the threaded end 4 thereof protruding from the piece of material 1.

Screwed upon the threaded end 4 of the bolt is a nut 5 having the outer side thereof provided with a conical-shaped sleeve 6, said sleeve having a threaded bore 7 registering with the threaded bore 8 of the nut 5, while the periphery of the sleeve 6 is smooth, and tapered, as at 9. The outer face of the nut 5 is provided with a plurality of recesses 10, these recesses intercepting the facets of the nut 5, as at $10^a$ and in communication with each recess is an inclined way $10^b$.

Screwed upon the threaded end of the bolt 3 is a square, hexagon or octagon shaped nut 11, said nut having the inner face thereof provided with an annular recess 12 having an inclined wall 13 to engage the outer periphery of the sleeve 6. Secured to the inner face of the nut 11 by screws 14 or other fastening means are two diametrically opposed compound curved resilient arms 15 adapted to engage in the recesses 10 of the nut 5, the nut 11 having the faces thereof cut away, as at $15^a$ to accommodate a portion of the resilient gripping arms 15.

The nut 5 is split or slotted, as at 16, whereby the nut 11 is screwed upon the bolt 3 and impinges the sleeve 6, the nut 5, which is preferably made of a malleable metal, is sprung or contracted to frictionally engage the threads of the bolt 3, and after the nut 11 has been rotated upon the sleeve 6 as far as possible, the resilient arms 15 will engage in two of the oppositely disposed recesses 10 and thereby hold the nuts 5 and 11 upon the bolt 3. It is the gripping action of the split nut 5 that firmly anchors the same upon the bolt after it has been contracted by the nut 11 upon the sleeve 6, the threads of the nut 11 in conjunction with the threads of the bolt 3 carrying said nut into proximity with the nut 5, whereby the resilient arms 15 can readily engage in the recesses 10.

The inclined ways $10^b$ permit of the arms 15 easily engaging in the recesses $10^a$ to prevent a rearward movement of the nut 5, and the lips $16^a$ above the inclined ways $10^b$ protect the arms 15, while the open ends of the recesses $10^a$ permit of an instrument being inserted behind the arms 15 and force the same out of the recesses $10^a$, whereby the nut 11 can be removed. The lips $17^a$ of the nut 11 protect the secured ends of the arms 15.

While in the drawing there is shown a preferred embodiment of the invention, it is to be understood that the structural elements thereof are susceptible to such changes as fall within the scope of the appended claim.

What I claim is:—

In a nut lock, the combination with two pieces of material, and a bolt extending through said material and having the threaded end thereof protruding from one of said pieces of material, of a split nut screwed upon said bolt to engage one of the pieces of material, said nut having the outer face thereof provided with a conical-shaped sleeve having a threaded bore registering with the threaded bore of said nut, said nut having the outer face thereof provided with a plurality of recesses in communication with inclined ways formed in the faces of said nut, a locking nut screwed upon said bolt and having the inner face thereof provided with a recess having tapering walls adapted to engage the smooth tapering periphery of said sleeve, and oppositely disposed compound curved resilient arms secured to the inner face of said locking nut and adapted to engage in two oppositely disposed recesses of said split nut, said nut being cut away to provide clearance for said arms, substantially as, and for the purpose herein described.

In testimony whereof I affix my signature in the presence of two witnesses.

JOHN ARRENBRECHT.

Witnesses:
JOHN ROBUSCH,
PETER HECK.